United States Patent [19]
Schwinn et al.

[11] Patent Number: 5,830,062
[45] Date of Patent: Nov. 3, 1998

[54] AGRICULTURAL COMBINE

[75] Inventors: Kevin Schwinn, Orion; Robert A. Matousek, Milan, both of Ill.

[73] Assignee: Case Corporation, Racine, Wis.

[21] Appl. No.: 797,464

[22] Filed: Feb. 6, 1997

[51] Int. Cl.⁶ .............................. A01F 12/44; A01F 12/46
[52] U.S. Cl. .......................... 460/100; 460/114; 460/901; 460/902
[58] Field of Search .............................. 460/100, 97, 98, 460/99, 101, 102, 114, 116, 119, 901, 902, 903

[56]     References Cited
        U.S. PATENT DOCUMENTS 3,847,160  11/1974  DeCoene et al. .
4,051,856  10/1977  Reed et al. ............................. 460/99 X
4,869,272   9/1989  Ricketts et al. .

Primary Examiner—Terry Lee Meluis
Attorney, Agent, or Firm—Mayer, Brown & Platt

[57] ABSTRACT

An agricultural combine having an enlarged cleaning area for enhancing the handling capacity of the machine without increasing the outside configuration thereof. The agricultural combine includes an elongated walled body arranged about and along an elongated separating mechanism. The combine further includes a cleaning station having a generally horizontal sieve disposed below the separating station so as to directly receive materials passing therefrom. The cleaning station further includes a blower assembly for directing a pressurized stream of air from an outlet end upwardly through the sieve thereby effecting a further cleaning function of the grain. The clean grain passing through the cleaning station falls into a clean grain area from whence an elevator transports the clean to grain an enhanced holding tank defined within the walled body of the combine. An apparatus is disposed proximate to and rearwardly of the outlet of the blower assembly for forcibly propelling material passing through and from the sieve away from the outlet end of the blower assembly. The apparatus is fitted relative to the combine such that the outer configuration of the combine remains substantially unchanged while enhancing the cleaning capacity thereof.

18 Claims, 2 Drawing Sheets

AGRICULTURAL COMBINE

FIELD OF THE INVENTION

The present invention generally related to agricultural combines and, more particularly, to agricultural combines with enlarged cleaning areas for promoting efficiency and effectiveness of the combine.

BACKGROUND OF THE INVENTION

A self-propelled combine typically includes a walled body mounted on wheels for movement over a field. In rotary combines, the walled body encloses an axially elongated rotor assembly defining a grain separating station including a fore-and-aft extending rotor surrounded by a partially foraminous housing. During operation, crop materials are separated into grain and material other than grain as they are processed while passing between inlet and outlet ends of the rotor assembly.

To effect further cleaning of the grain, rotary combines typically include a grain cleaning section or station. The grain cleaning station typically includes one or more sieves mounted in crop receiving relation relative to the rotor assembly. The sieves are usually mounted for oscillatory movement to effect arrangement of the crop materials deposited thereon in a relatively thin crop veil or mat. The cleaning station of the combine further includes a fan or blower assembly for directing a flow of air from an outlet end thereof upwardly through the crop veil or mat disposed on the sieve. The air directed upwardly through the sieves serves to further clean grain from material other than grain. Lighter materials such as chaff, tailings and the like are separated from the grain and entrained in the air stream and, ultimately, are directed out through an opening in the back of the machine.

The heavier clean grain falls through the sieve and is received and held in a clean grain receiving area. The clean grain receiving area is typically defined by an elongated pan having a trough or open channel formed therein. A suitable material conveyer such as a rotatable auger is mounted in the clean grain receiving area for delivering crop materials to an elevator arranged outside of the walled enclosure. As is typical, the clean grain receiving auger extends through a sidewall of the combine to deliver the crop material to an inlet end of the elevator. The use of relatively large drive wheels on the combine limits the forward disposition of the elevator and, thus, the clean grain receiving area on the combine. The elevator transfers the clean grain to a suitable storage bin or area on the machine.

Advances in rotary combine technology advantageously allow the separating station to deliver to the cleaning station a greater amount of material than heretofore known. Moreover, it is possible to enlarge the capacity of the grain storage area on the machine. The cleaning area of known combines, however, has limited material handling capacity.

As will be appreciated, size constraints of the machine mandate the outside dimensions thereof. That is, the combine cannot be much longer than they are today because of the turning radius of the machine. In order to fit through existing openings and be driven over roads to various locations, the combines cannot be made wider or taller. The ground clearance area of the machines dictate the distance the lower most edge must be disposed relative to the ground to allow the machine to traverse existing terrain.

Thus, there is a need and a desire for an agricultural having enhanced material cleaning capacity without materially altering the dimensions of the machine.

SUMMARY OF THE INVENTION

In view of the above, and in accordance with the present invention, there is provided an agricultural combine having an enlarged cleaning area that enhances the processing capacity of the machine without increasing the outside configuration thereof. The agricultural combine includes an elongated walled body having a longitudinal axis with an elongated separating mechanism defining a separating station disposed in the walled body in general parallel relationship with the axis of the walled body. The combine further includes a cleaning station having a generally horizonal sieve disposed below the separating station so as to directly receive materials passing therefrom. The cleaning station further includes a blower assembly for directing a pressurized stream of air from an outlet end upwardly through the sieve thereby effecting a further cleaning function of the grain. The clean grain passing through the elevator falls into a clean grain area from whence an elevator transports the grain to a clean grain tank having enhanced holding capacity and defined within the walled body of the combine.

A salient feature of the present invention involves extending the sieve forwardly beneath the separating apparatus such that a front edge of the sieve underlies a forward end of the rotary assembly thereby enhancing the cleaning area of the combine. Although the cleaning area and, thus, the material handling capacity of the combine is enhanced, disposition of the elevator relative to the wheels of the combine continues to mandate the position of the clean grain receiving area. Because of the extended position of the sieve and the reward disposition of the clean grain receiving area, material passing from the sieve tend to accumulate toward the outlet end of the blower assembly and, in some instances, interfere with the delivery of an adequate upwardly directed air flow through the sieve. Moreover, granular materials passing into the outlet of the blower assembly tend to interfere with the rotary fan and can possibly cause damage thereto.

According to the present invention, a grain engaging apparatus is disposed proximate to and rearwardly of the outlet of the blower assembly for forcibly propelling material passing through and from the sieve away from the outlet end of the blower assembly. Advantageously, the apparatus of the present invention is fitted relative to the combine such that the outer configuration of the combine remains substantially unchanged while enhancing the cleaning capacity thereof.

The apparatus of the present invention is mounted for rotation about an axis extending generally normal to the longitudinal axis of the machine. In one form of the invention, the apparatus includes an axially elongated multivaned rotational member extending between opposed sides of the walled body of the combine. It will be appreciated that the vaned rotational member can be extruded or may comprise a series of brushes extending radially outwardly from a central hub. In a preferred form, the rotational member for propelling material rearwardly is arranged in combination with an elongated pan defming an open channel or through in which the rotational member is mounted.

During operation of the combine, materials directly fall from the foraminous casing of the separator assembly toward the cleaning area. More specifically, clean grain falls directly from the separating apparatus onto the sieves and passes therethrough to either the clean grain receiving area or the pan of the apparatus of the present invention.

As the apparatus of the present invention rotates, it forcibly propels grain engaged thereby rearwardly thereby delivering additional clean grain material to the clean grain receiving area for subsequent delivery to the clean grain storage bin or holding area on the combine. To inhibit the apparatus of the present invention from propelling materials forwardly toward the outlet of the blower assembly, an elongated shield extends over and along the rotational member of the apparatus of the present invention. The shield preferably has a convex configuration arranged relative to the rotational member to inhibit grain from being propelled forwardly into the outlet of the blower assembly upon rotation of the member of the present invention. In a most preferred form of the invention, a mechanism is provided for controlling the rotational speed of the apparatus of the present invention.

The apparatus of the present invention positively moves grain rearwardly away from the outlet end of the blower assembly toward the clean grain area under the sieve. Thus, the cleaning sieve can be extended forwardly thus increasing the handling capacity of the combine without significantly altering the outer dimensions of the combine. With the present invention, and although the disposition of the clean grain receiving area is mandated by the machine design, the ability to rearwardly move crop materials into the clean grain receiving area promotes operation of the combine with a simplistic change made thereto.

These and other objects, aims, and advantages of the present invention will become readily apparent from the following detailed description, the drawings, and the appended claims.

DETAILED DESCRIPTION OF THE PRESENT INVENTION

Figure 1:
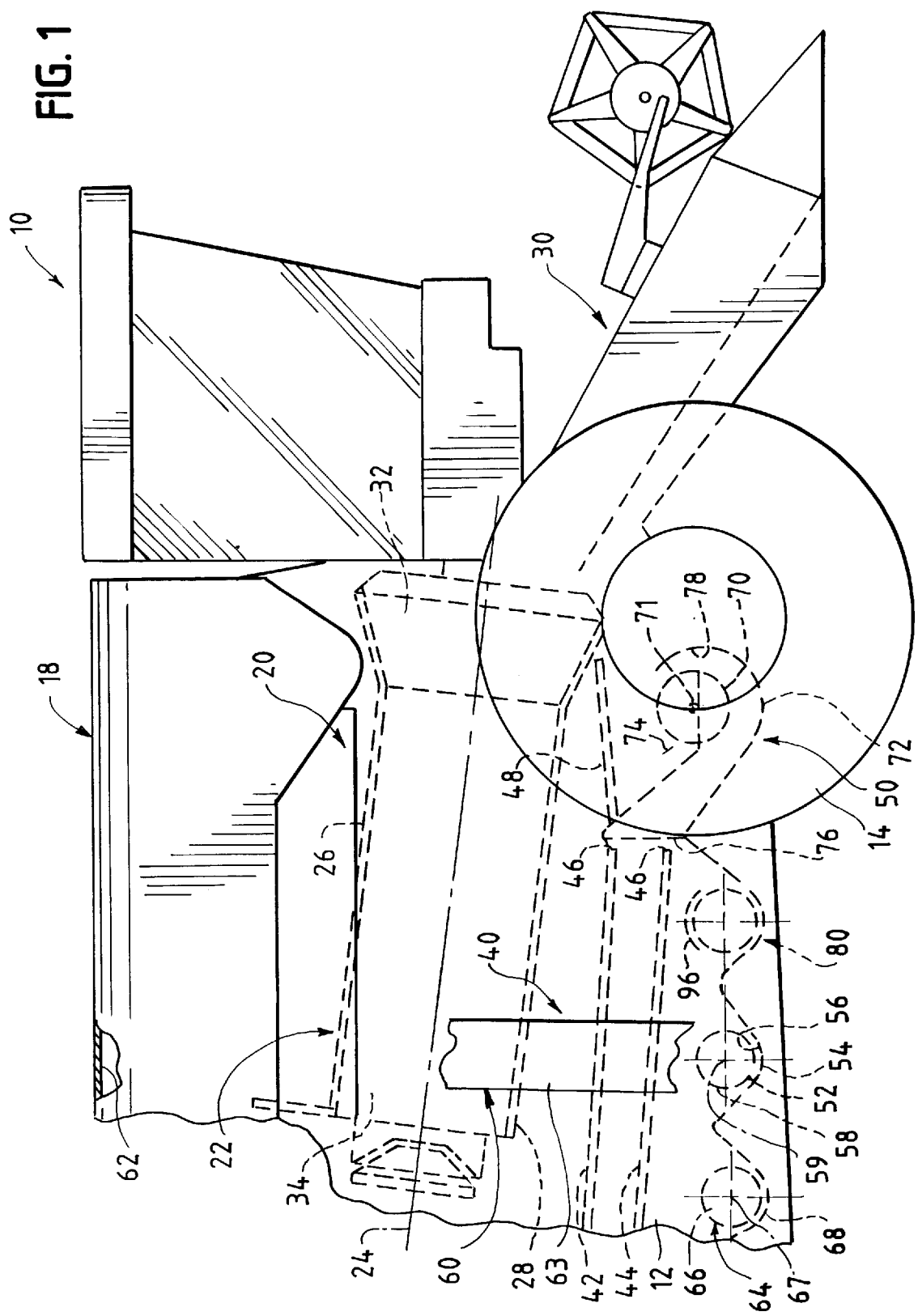
FIG. 1 schematically illustrates a side elevational view of a combine embodying features of the present invention.

While the present invention is susceptible of embodiment in various forms, there is shown in the drawings a presently preferred embodiment of the invention which is hereinafter described, with the understanding that the present disclosure is to be considered as an exemplification of the invention, which is not intended to limit the invention to the specific embodiment illustrated.

Referring now to the drawings, wherein like reference numerals refer to like parts throughout the views, in FIG. 1 there is shown a self-propelled agricultural combine 10 to which the present invention applies. The illustrated combine 10 is of the type sold by Case Corporation of Racine, Wisconsin under Model No. 2100. It will be appreciated, however, the present invention equally applies to other rotary combines.

Suffice it to say, the combine 10 includes a mobile frame 12 which, in the illustrated embodiment is mounted on a pair of relatively large front drive wheels 14 and a pair of rear steerable wheels (not shown). Combine 10 also includes a walled enclosure 18 arranged in surrounding relation relative to a separating station 20. The separating station 20 is defined by an axially elongated rotor assembly 22 mounted for rotation about a fixed axis 24 extending generally parallel to the longitudinal axis of the walled enclosure 18. The rotor assembly 22 includes a suitably configured, relatively large diameter rotor 26 mounted within a partially foraminous housing 28.

A gathering and conveying mechanism 30 is disposed at a forward end of the frame 12. During combine operation, mechanism 30 serves to remove crop material from a field and deliver the crop materials to an inlet end 32 of the rotor assembly 22. Crop materials are introduced at the inlet end 32 of the rotor assembly 22 and are repeatedly and gently spiraled toward an outlet end 34 of the rotor assembly 22. Through the combined action of the rotor 26 and the housing 28, grain is separated from the majority of material other than grain. Material other than grain includes, tailings and a myriad of forms of other debris. As will be appreciated by those skilled in the art, material which is too large to pass through the openings in housing 28 rearwardly passes through the rotor assembly 22 toward and, ultimately, is exhausted from the outlet end 34.

The combine 10 is further provided with a grain cleaning station 40. As shown, the grain cleaning station 40 preferably includes a pair of sieves 42 and 44 for directly receiving materials gravitationally passing through and from the foraminous housing 28 of rotor assembly 22. Each sieve 42, 44 has a generally rectangular configuration and includes a front end portion 46 disposed below and proximate to the inlet end 32 of the rotor assembly 22. Suffice it to say, each sieve 42, 44 is disposed at least in underlying relationship to the rotor assembly 22 to directly receive crop materials passing therefrom. As is well known, each sieve 42, 44 is mounted for endwise reciprocal movements such that materials gravitationally received thereby are arranged in a relatively thin veil or mat across and between opposite ends of each sieve 42, 44. In the illustrated embodiment, a downwardly and rearwardly extending pan 48 is positioned relative to the rotor assembly 22 for delivering additional crop materials passing from a forward end of the rotor assembly 22 toward the sieves 42, 44.

The grain cleaning section 40 of the combine further includes a fan assembly or blower assembly 50. Preferably, the fan assembly 50 is substantially similar to the fan assembly disclosed and claimed and co-pending and co-assigned U.S. patent application Ser. No. 08/513,013 filed on Aug. 9, 1995; the full disclosure of which is incorporated herein by reference.

During operation of the combine, the fan assembly 50 serves to upwardly direct a stream of air through the veil or mat of material on each sieve 42, 44 of the cleaning section 40. Lighter materials, entrapped in the upwardly directed airstream, are separated from the heavier materials and are blown out the rear end of the combine. Heavier grain falls through the sieves 42, 44 to a clean grain collection area 52 defined by an elongated pan 54 extending between opposite sides of the walled enclosure 18. Notably, the pan 54 has a generally concave recess 56 for collecting clean grain therewithin. A suitable clean grain conveyor, such as an auger 58 extending between opposed side walls of the enclosure 18 and having a rotational axis 59 extending generally normal to the longitudinal axis of the machine 10, directs the grain from the collection area 52 toward a conventional elevator 60 disposed outside of the walled enclosure 18. The elevator 60 serves to move clean grain material to a clean grain collecting bin 62 (FIG. 1) mounted on the frame 12 of the combine 10. As is well known, and as is appreciated by those skilled in the art, the auger 58 extends axially endwise through a sidewall in the walled enclosure 18 to deliver crop materials to an inlet end of the elevator 60. The elevator 60 typically includes a housing 63 disposed rearwardly of the front drive wheels 14 of the combine 10.

Figure 2:
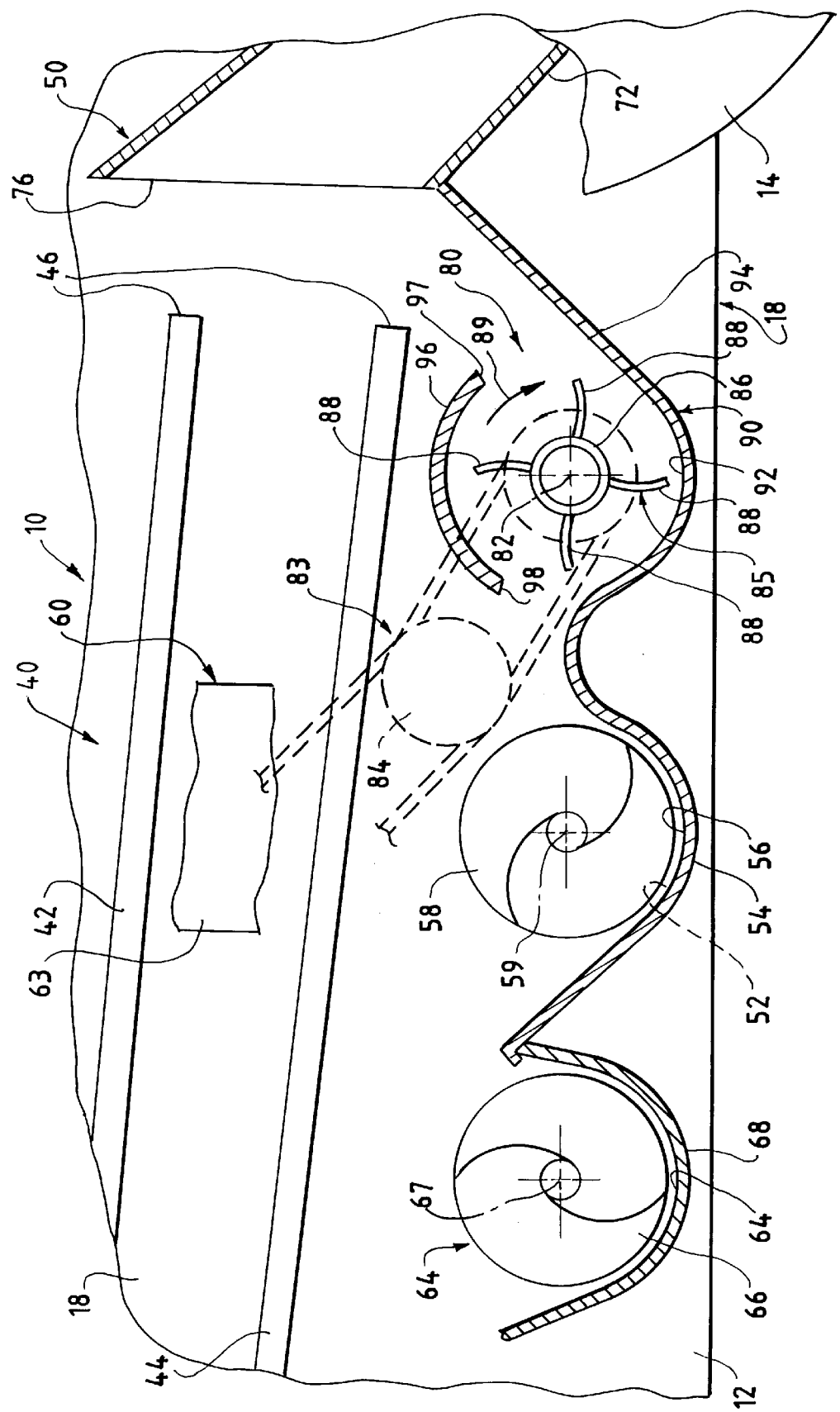
FIG. 2 is an enlarged view of a lower area of the combine illustrated in FIG. 1.

As schematically represented in FIGS. 1 and 2, it is common for the combine 10 to further include a tailings conveyor 64 mounted rearwardly of the clean grain conveyor 58. Conveyor 64 is preferably configured as an auger 66 rotatably mounted between opposed side walls of the enclosure 18 and rotatable about an axis 67 extending normal to longitudinal axis of the machine. The auger 66 is rotatably arranged within an elongated trough 68 carried on the frame 12 of the combine 10. Like the clean grain conveyor 58, the tailings auger 66 extends endwise through one of the sidewalls on the walled enclosure 18 to deliver tailings and the like material to an inlet end of a conventional tailings elevator (not shown). As is well known, the purpose of the tailings elevator is to deliver tailings passing from the rotor assembly 22 to the rotor assembly 22 for rethreshing.

The fan assembly 50 of the cleaning station 40 comprises an elongated centrifugal or cross flow fan 70 and a housing 72. The fan 70 preferably extends transversely across substantially the entire width of the combine 10. More specifically, the centrifugal fan 70 is transversely mounted on the frame 12 beneath the grain separating station 20 and preferably forward of the cleaning sieves 42, 44. As described in detail in the above identified co-pending and co-assigned U.S. patent application, fan 70 includes a series of closely spaced fan blades arranged in a circumferential array or pattern about the longitudinal axis 71 of the fan 70 to define an open center for the fan.

Housing 72 of blower assembly 50 extends parallel to and along substantially the entire length of the fan 70. The housing 72 is preferably fabricated from an air impervious material such steel or the like and defines an elongated air inlet opening 74 and an elongated air outlet opening 76 for directing air discharged therefrom toward the cleaning sieves 42, 44. The housing 72 further defines an internal chamber 78, wherein the fan 70 is rotatably mounted to drive air between the air inlet and air outlet openings 74 and 76 respectively.

According to the present invention, an apparatus 80 is disposed proximate to and rearwardly of the blower assembly 50 for forcibly propelling material directly received from the sieves 42, 44 away from the outlet end 76 of the blower assembly. As shown in FIGS. 1 and 2, the apparatus 80 is disposed rearwardly of the outlet end 76 of the blower assembly 50 and forwardly of the rotational axis 59 of the clean grain conveyor 58 and the tailings conveyor 64.

Apparatus 80 is mounted for rotation about an axis 82 extending generally normal to the longitudinal axis of the machine and generally parallel to the axis 59 of the clean grain conveyor 58. As shown in FIG. 2, a suitable mechanism 83, such as an adjustable pulley 84, is provided for adjustably controlling the rotational speed of the apparatus 80. Alternatively, a variable speed motor (not shown) can be used to control the rotational speed of the apparatus 80.

Apparatus 80 preferably includes an axially elongated rotatable member 85. In the illustrated embodiment, member 85 includes a hub 86 with plurality of vanes 88 radially extending from hub 86. The hub 86 and vanes 88 extend between opposed sides of the walled enclosure 18. Notably, in a preferred form of the invention, the vanes 88 have a swept back design relative to the direction of rotation of apparatus 80 indicated in the drawings by arrow 89. The rotatable member 85 is preferably formed as an extruded one piece elongated member. Alternatively, however, the vanes 88 of member 85 may comprise a series of brushes without detracting or departing from the spirit and scope of the present invention.

The rotatable member 85 of apparatus 80 is mounted in combination and for rotation relative to an elongated rigid pan 90 defining an open channel or trough 92 extending between opposite side of the walled body 18. Notably, the pan 90 has a sloping front wall 94 that joins the trough 92 to the casing or housing 72 of blower assembly 50.

The apparatus 80 of the present invention further includes a rigid shield 96 disposed over the rotatable member 85. The shield 96 has an elongated configuration which extends the length of the apparatus 80 for inhibiting grain from being propelled forwardly into the outlet 76 of the blower assembly 50 upon rotation of the rotatable member 85. The shield 96 preferably includes generally parallel forward and rear edges 97 and 98, with a convex configuration extending therebetween. In addition to inhibiting grain from being propelled toward the outlet 76 of blower assembly 50, shield 96 is placed above the rotating member 85 to control where grain falling through the sieves 42 and 44 is first contacted by the rotating vanes 88 of rotatable member 85.

With the present invention, the rotatable member 85 forcibly propels grain directly received from the sieves 42 and 44 and held in pan 92 rearwardly toward the clean grain collection area 52 from whence the material is advanced under the influence of conveyor 58 through the sidewall of the enclosure 18 to an inlet end of the elevator 60 and thence to the clean grain storage area 62. During operation of the combine 10, the apparatus 80 of the present invention keeps grain out of the outlet 76 of the blower assembly 50 by propelling the grain rearwardly of the machine. The addition of apparatus 80 to the combine allows for larger tires to be used in combination with the combine. Moreover, the addition of apparatus 80 allows the rectangular configuration of the sieves 42, 44 and, thus, the cleaning station 40 to be enlarged in a manner allowing an increase in material to be directly received from the rotor assembly 22 and effectively and efficiently processed thereby promoting the capacity of the combine. Notably, with the present invention, the size of the cleaning area 40 is enlarged thus promoting the capabilities of the machine without changing the outer configuration of the combine or taking up valuable space from the separating station 20 or the clean grain holding tank 62 of the combine.

From the foregoing, it will be observed that numerous modifications and variations can be effected without departing from the true spirit and scope of the novel concept of the present invention. It would be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An agricultural combine, comprising:
   an elongated walled body having a longitudinal axis;
   a separating mechanism for processing crop materials presented thereto;
   a generally horizontal sieve for allowing clean grain to pass therethrough, said sieve being disposed below and at least partially underlying the separating mechanism so as to directly receive materials gravitationally passing therefrom;
   a blower assembly for directing a pressurized stream of air from an outlet end thereof upwardly through said sieve thereby facilitating separation of grain from material other than grain, said blower assembly being disposed below and toward the inlet end of said separating mechanism;
   a clean grain area for receiving and holding clean grain material passing through and from said sieve;

an elevator arranged in operable combination with said clean grain area for removing clean grain stored in said clean grain area; and an apparatus disposed between said blower assembly and said elevator in partial engagement with clean grain passing through said sieve for propelling grain passing into engagement therewith toward a rear end of the combine thereby inhibiting blockage of the outlet of said blower assembly while minimizing height requirements of the combine.

2. The agricultural combine according to claim 1 wherein said apparatus is mounted for rotation about an axis extending generally normal to said longitudinal axis.

3. The agricultural combine according to claim 2 further including a mechanism for controlling the rotational speed of said apparatus.

4. The agricultural combine according to claim 1 wherein said apparatus includes an axially elongated multi-vaned rotational member extending between opposed sides of said walled body.

5. An agricultural combine comprising:

an elongated walled body having a longitudinal axis;

a separating mechanism for processing crop materials presented thereto;

a generally horizontal sieve for allowing clean grain to pass therethrough, said sieve being disposed below and at least partially underlying the separating mechanism so as to directly receive materials gravitationally passing therefrom;

a blower assembly for directing a pressurized stream of air from an outlet end thereof upwardly through said sieve thereby facilitating separation of grain from material other than grain, said blower assembly being disposed below and toward the inlet end of said separating mechanism;

a clean grain area for receiving and holding clean grain material passing through and from said sieve;

an elevator arranged in operable combination with said clean grain area for removing clean grain stored in said clean grain area;

an apparatus disposed between said blower assembly and said elevator for propelling grain passing into engagement therewith toward a rear end of the combine thereby inhibiting blockage of the outlet of said blower assembly while minimizing height requirements of the combine;

wherein said apparatus is mounted for rotation about an axis extending generally normal to said longitudinal axis; and further including a shield extending over and along said apparatus for inhibiting grain from being propelled forwardly into the outlet of said blower assembly upon rotation of said apparatus.

6. An agricultural combine comprising:

an elongated walled body having a longitudinal axis;

a separating mechanism for processing crop materials presented thereto;

a generally horizontal sieve for allowing clean grain to pass therethrough, said sieve being disposed below and at least partially underlying the separating mechanism so as to directly receive materials gravitationally passing therefrom;

a blower assembly for directing a pressurized stream of air from an outlet end thereof upwardly through said sieve thereby facilitating separation of grain from material other than grain, said blower assembly being disposed below and toward the inlet end of said separating mechanism;

a clean grain area for receiving and holding clean grain material passing through and from said sieve;

an elevator arranged in operable combination with said clean grain area for removing clean grain stored in said clean grain area;

an apparatus disposed between said blower assembly and said elevator for propelling grain passing into engagement therewith toward a rear end of the combine thereby inhibiting blockage of the outlet of said blower assembly while minimizing height requirements of the combine;

wherein said apparatus includes an axially elongated multi-vaned rotational member extending between opposed sides of said walled body; and further including an elongated pan defining an open channel in which said multi-vaned member is mounted for rotation.

7. The agricultural combine according to claim 6 further including a shield extending over and along said multi-vaned member for inhibiting grain from being propelled forwardly into the outlet of said blower assembly upon rotation of said multi-vaned member.

8. An agricultural combine, comprising:

a mobile frame;

a separating mechanism for processing crop materials presented thereto;

an elongated walled body carried by said frame and arranged in surrounding relation relative to said separating mechanism;

a gathering and conveying mechanism disposed at a front end of said combine and operable to remove crop material from a field and deliver said crop material to the inlet to said separating mechanism;

a generally horizontal sieve for allowing clean grain received from said separating mechanism to pass therethrough, said sieve being disposed at least partially in underlying and direct crop receiving relationship relative to said separating mechanism;

a blower assembly for directing a stream of air from an outlet end thereof upwardly through said sieve to facilitate separation of grain from material other than grain; and an apparatus disposed proximate to and rearwardly of the outlet of said blower assembly in partial engagement with clean grain passing through said sieve for forcibly propelling material passing through and from said sieve away from the outlet end of said blower assembly.

9. The agricultural combine according to claim 8 wherein said blower assembly comprises an elongated centrifugal fan mounted for rotation in an elongated housing defining the outlet end of said blower assembly.

10. The agricultural combine according to claim 8 wherein said apparatus is mounted for rotation about an axis extending generally normal to said elongated separating mechanism.

11. The agricultural combine according to claim 10 further including a mechanism for controlling the rotational speed of said apparatus.

12. An agricultural combine comprising:

a mobile frame;

a separating mechanism for processing crop materials presented thereto;

an elongated walled body carried by said frame and arranged in surrounding relation relative to said separating mechanism;

a gathering and conveying mechanism disposed at a front end of said combine and operable to remove crop material from a field and deliver said crop material to the inlet to said separating mechanism;

a generally horizontal sieve for allowing clean grain received from said separating mechanism to pass therethrough, said sieve being disposed at least partially in underlying and direct crop receiving relationship relative to said separating mechanism;

a blower assembly for directing a stream of air from an outlet end thereof upwardly through said sieve to facilitate separation of grain from material other than grain;

an apparatus disposed proximate to and rearwardly of the outlet of said blower assembly for forcibly propelling material passing through and from said sieve away from the outlet end of said blower assembly;

wherein said blower assembly comprises an elongated centrifugal fan mounted for rotation in an elongated housing defining the outlet end of said blower assembly; and wherein said apparatus includes an elongated pan defining an open channel in which a multi-vaned member is mounted for rotation.

13. The agricultural combine according to claim 12 further including an elongated convexly curved shield extending over and along said multi-vaned member for inhibiting grain from being propelled forwardly toward the outlet end of said blower assembly.

14. An agricultural combine comprising:

a mobile frame;

a separating mechanism for processing crop materials presented thereto;

an elongated walled body carried by said frame and arranged in surrounding relation relative to said separating mechanism;

a gathering and conveying mechanism disposed at a front end of said combine and operable to remove crop material from a field and deliver said crop material to the inlet to said separating mechanism;

a generally horizontal sieve for allowing clean grain received from said separating mechanism to pass therethrough, said sieve being disposed at least partially in underlying and direct crop receiving relationship relative to said separating mechanism;

a blower assembly for directing a stream of air from an outlet end thereof upwardly through said sieve to facilitate separation of grain from material other than grain;

an apparatus disposed proximate to and rearwardly of the outlet of said blower assembly for forcibly propelling material passing through and from said sieve away from the outlet end of said blower assembly;

wherein said apparatus is mounted for rotation about an axis extending generally normal to said elongated separating mechanism; and further including a shield extending over and along said apparatus for inhibiting grain from being propelled forwardly into the outlet of said blower assembly upon rotation of said apparatus.

15. An agricultural combine, comprising:

a mobile frame;

a separating mechanism for processing crop materials presented thereto;

an elongated walled body carried by said frame and arranged in surrounding relation relative to said separating mechanism, said body including laterally spaced side walls disposed on opposite sides of said separating mechanism;

a gathering and conveying mechanism disposed at a front end of said combine and operable to remove crop material from a field and deliver said crop material to an inlet end of said separating mechanism;

a generally horizontal sieve for allowing clean grain received from said separating mechanism to pass therethrough, said sieve being disposed at least partially in underlying relationship relative to said separating mechanism to directly receive material gravitationally passing from said separating mechanism;

a blower assembly for directing a stream of air from an outlet end thereof upwardly through said sieve to facilitate separation of grain from material other than grain; and an elongated apparatus disposed between the opposed sides of said walled enclosure proximate to and rearwardly of the outlet of said blower assembly, in partial engagement with clean grain passing through said sieve for collecting material passing through and from said sieve and conveying said material away from the outlet end of said blower assembly.

16. The agricultural combine according to claim 15 wherein said blower assembly comprises an elongated centrifugal fan and a housing arranged in surrounding relation along and about said fan, with said housing defining the outlet of said blower assembly.

17. An agricultural combine comprising:

a mobile frame;

a separating mechanism for processing crop materials presented thereto;

an elongated walled body carried by said frame and arranged in surrounding relation relative to said separating mechanism, said body including laterally spaced side walls disposed on opposite sides of said separating mechanism;

a gathering and conveying mechanism disposed at a front end of said combine and operable to remove crop material from a field and deliver said crop material to an inlet end of said separating mechanism;

a generally horizontal sieve for allowing clean grain received from said separating mechanism to pass therethrough, said sieve being disposed at least partially in underlying relationship relative to said separating mechanism to directly receive material gravitationally passing from said separating mechanism;

a blower assembly for directing a stream of air from an outlet end thereof upwardly through said sieve to facilitate separation of grain from material other than grain;

an elongated apparatus disposed between the opposed sides of said walled enclosure proximate to and rearwardly of the outlet of said blower assembly for collecting material passing through and from said sieve and conveying said material away from the outlet end of said blower assembly;

wherein said blower assembly comprises an elongated centrifugal fan and a housing arranged in surrounding relation along and about said fan, with said housing defining the outlet of said blower assembly; and wherein said elongated apparatus includes a rigid pan defining an open channel in which a multi-vaned rotational member is mounted for rotation about an axis extending generally normal to a longitudinal axis of said separating mechanism, and wherein said pan is joined to the outlet end of the housing of said blower assembly.

18. The agricultural combine according to claim 17 further including an elongated shield extending over and at least partially about said multi-vaned member for inhibiting grain from being propelled forwardly into the outlet of said blower assembly upon rotation of said multi-vaned member.

* * * * *